United States Patent
Kim et al.

(10) Patent No.: US 6,469,999 B1
(45) Date of Patent: Oct. 22, 2002

(54) METHOD FOR CONNECTING DAISY CHAINED BASE TRANSCEIVER STATIONS BY UTILIZING A MULTIPLEXER AND DEMULTIPLEXER AND THE APPARATUS THEREOF

(75) Inventors: Byung-chul Kim, Seoul (KR); Do-jun Park, Seoul (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/342,724

(22) Filed: Jun. 29, 1999

(30) Foreign Application Priority Data

Jun. 30, 1998 (KR) .............................. 98-25469

(51) Int. Cl.[7] ................................. H04Q 7/34
(52) U.S. Cl. .................. 370/338; 370/535; 370/537; 370/542; 370/340; 370/403; 370/404
(58) Field of Search ................ 370/338, 328, 370/402, 403, 404, 340, 341, 535, 537, 542

(56) References Cited

U.S. PATENT DOCUMENTS

| | | | |
|---|---|---|---|
| 5,260,967 A | | 11/1993 | Schilling |
| 5,627,879 A | | 5/1997 | Russell et al. |
| 5,699,356 A | * | 12/1997 | Beever et al. ............... 370/329 |
| 5,715,251 A | * | 2/1998 | Du .............................. 370/404 |
| 5,761,195 A | * | 6/1998 | Lu et al. ...................... 370/329 |
| 5,812,546 A | | 9/1998 | Zhou et al. |
| 5,818,824 A | * | 10/1998 | Lu et al. ...................... 370/328 |
| 5,850,394 A | | 12/1998 | Sekine et al. |
| 6,034,950 A | * | 3/2000 | Sauer et al. ................. 370/328 |
| 6,148,010 A | * | 11/2000 | Sutton et al. ............... 370/536 |

* cited by examiner

*Primary Examiner*—Edward F. Urban
*Assistant Examiner*—Marceau Milford
(74) *Attorney, Agent, or Firm*—Dilworth & Barrese, LLP

(57) ABSTRACT

A method and apparatus for connecting daisy chained BTSs (Base Transceiver Stations) by utilizing a multiplexer and a demultiplexer is disclosed. The BSC (Base Station Controller) generates packets to be passed to the daisy chained BTS and multiplexes the packets to transmit them to the BTS. The BTS receives the multiplexed packets and demultiplexes the packets, and as a result of the demultiplexing, if the packets are for the respective BTS, then the respective BTS receives them and transmits the remaining packets to the next BTSs. Additionally, the daisy chained BTS being connected to other BTS generates packets to be passed to a BTS and decodes the transmitted packets. As a result of the decoding, if the packets are for the respective BTS, the respective demultiplexer passes the packets to the corresponding BTS; otherwise, it passes the packets to the BSC.

11 Claims, 5 Drawing Sheets

METHOD FOR CONNECTING DAISY CHAINED BASE TRANSCEIVER STATIONS BY UTILIZING A MULTIPLEXER AND DEMULTIPLEXER AND THE APPARATUS THEREOF

CLAIM OF PRIORITY

This application makes reference to, incorporates the same herein, and claims all benefits accruing under 35 U.S.C. §119 from an application entitled METHOD FOR CONNECTING THE DAISY CHAINED BASE TRANSCEIVER STATIONS BY UTILIZING THE MULTIPLEXER AND DEMULTIPLEXERS AND THE APPARATUS THEREOF earlier filed in the Korean Industrial property Office on Jun. 30, 1998, and there duly assigned Serial No. 1998-25469.

BACKGROUND OF THE INVENTION

1. Field of the Invention

The present invention relates to base transceiver stations (BTSs) of a cellular mobile telecommunication system, and more particularly, it relates to a method and apparatus for connecting daisy chained BTSs by utilizing a multiplexer and demultiplexers.

2. Description of the Related Art

In a cellular mobile telecommunication system, the coverage area is divided into a plurality of BTSs and is comprised of cells, that is, small coverage areas, and these BTSs are controlled by a MSC (Mobile Switching Center) so that the subscribers can continue to communicate with each other while moving between the cells. As the cellular system makes it possible to re-use a limited number of frequencies by dividing the coverage areas into cells, the efficiency of frequency use increases, making it possible to accommodate an increasing number of subscribers.

The mobile telecommunication system using CDMA technology includes BTSs which provide mobile telecommunication services to a mobile station moving within an area, the BSC (Base Station Controller) which controls a plurality of BTSs, and the MSC which connects a plurality of the BSCs with a PSTN (Public Switched Telephone Network).

FIG. 1 shows conventional radiation type BTSs. As shown, the BTSs 10, 20, 30, 40, 50, 60, 70, 80, 90 covering each cell are connected to the BSC 1 through at least one trunk. The BSC transmits message packets to each BTS through the trunk(s).

The BSC is connected to the trunk through the LCIN (Link Communication Interface Node assembly), and the BTSs are connected to the trunks through the BCIN (Base station Communication Interface Node assembly).

When connecting the BSC with the BTS through each trunk, the complexity of the trunks required to connect the omni type BTS, the omni type BTS having a much smaller call capacity than that of the trunk, highly increases. Therefore, a method for connecting a plurality of the trunks with small capacity through a trunk by a daisy chain arrangement is provided. The BSC is connected to the first BTS among the daisy chained BTSs, and controls a plurality of the BTSs connected to the BSC, and connects the BTSs to the MSC.

However, when using the above mentioned configuration, a method for adequately distinguishing and controlling the respective daisy chained BTSs is required. Therefore, a method for increasing the efficiency of the trunks and effectively controlling the respective BTSs without modifying the existing hardware or software configuration is also provided.

SUMMARY OF THE INVENTION

It is an object of the present invention to provide a method and apparatus for implementing the daisy chained BTSs without changing the existing configuration by installing multiplexers at the BSC and installing demultiplexers at the BTSs.

In one embodiment of the invention, a method for connecting the daisy chained BTSs by utilizing a multiplexer and a demultiplexer, comprises the steps of: generating packets which are transmitted by the BSC to a daisy chained BTS; multiplexing the packets and transmitting the multiplexed packets to the first BTS among the daisy chained BTSs; receiving the multiplexed packets at the first BTS, and demultiplexing the multiplexed packets; and receiving the demultiplexed packets that are transmitted to the first BTS and passing the remaining packets to a next BTS.

The addresses of the destination BTSs are added to the packets in the step of multiplexing the packets.

The method further includes a step of decoding the address of the received packets and selecting only the packets having the address of a BTS connected to the first BTS and passing the selected packets to the first BTS.

In another embodiment of the invention, a method for connecting the daisy chained BTSs by utilizing a multiplexer and a demultiplexer comprises the steps: generating packets to transmit to a BTS daisy chained with other BTSs; decoding the generated packet using the demultiplexer; transmitting the decoded packets to the respective BTS, if the packets are to be transmitted to the respective BTS daisy chained with other BTSs; and transmitting the generated packets to the BSC, if the decoded packets are not packets to be transmitted to the BTS.

The decoding step comprises the steps of: storing the packets, generated by a BTS, in a buffer; and reading the destination address of the stored packets, and decoding the packets.

An apparatus for connecting the daisy chained BTSs by utilizing the multiplexer and demultiplexer, according to a preferred embodiment of the present invention, comprises: a plurality of daisy chained BTSs; a BSC (Base Station Controller) generating packets to transmit to the plurality of daisy chained BTSs; a multiplexer multiplexing the generated packets; a plurality of demultiplexers, each one of the plurality of demultiplexers receiving the multiplexed packets through a first trunk, and demultiplexing the received packets, each one of the plurality of BTSs receiving only the packets transmitted to a respective BTS among the demultiplexed packets and passing the remaining packets to the demultiplexer of the next BTS; the first trunk transmitting the multiplexed packets to the BSC and the first connected BTS; and a second dual line trunk connecting each BTS.

The multiplexer is connected to the BSC through the LCIN (Local Communication Interface Node assembly), and each demultiplexer is connected to each respective BTS through the BCIN (BTS Communication Interconnect Network) within he BTS.

Each demultiplexer comprises: a serial-to-parallel converter; a parallel-to-serial converter; an E1/T1 framer being connected to the BSC through the serial-to-parallel converter and being connected to an other BTS through the parallel-to-serial converter; an RS422 transmit/receive port; an address filter being connected to the E1/T1 framer and being connected to the BCIN in the each BTS through the RS422 transmit/receive port; a processor controlling the operation of the E1/T1 framer; a write/read port; a boot ROM (Read Only Memory); a SRAM (Static Random Access Memory); a DPRAM (Dual Port Random Access Memory); and a EPLD (Electrical Programmable Logic Device) generating an E1/T1 transmit/receive clock by receiving the clock of the BTS.

In another embodiment according to the present invention an apparatus is provided for connecting a plurality of daisy chained BTSs by utilizing a multiplexer and a plurality of demultiplexers. The apparatus includes a plurality of BTSs and a plurality of demultiplexers, wherein each one of the plurality of BTSs is connected to the daisy chained BSC (Base Station Controller) and other BTSs, and generates the packets to transmit to a BTS. Each one of the plurality of demultiplexers decodes the generated packets, selects the packets among the generated packets whose destination is a BTS being connected to each demultiplexer, transmits the selected packets to the destination BTS, and transmits other packets to the adjacent BTS toward the BSC. Each of the plurality of demultiplexers is connected to the each one of the plurality of BTSs respectively.

Each demultiplexer decodes packets by filtering the addresses of the generated packets.

DETAILED DESCRIPTION OF THE PREFERRED EMBODIMENTS

Figure 1:
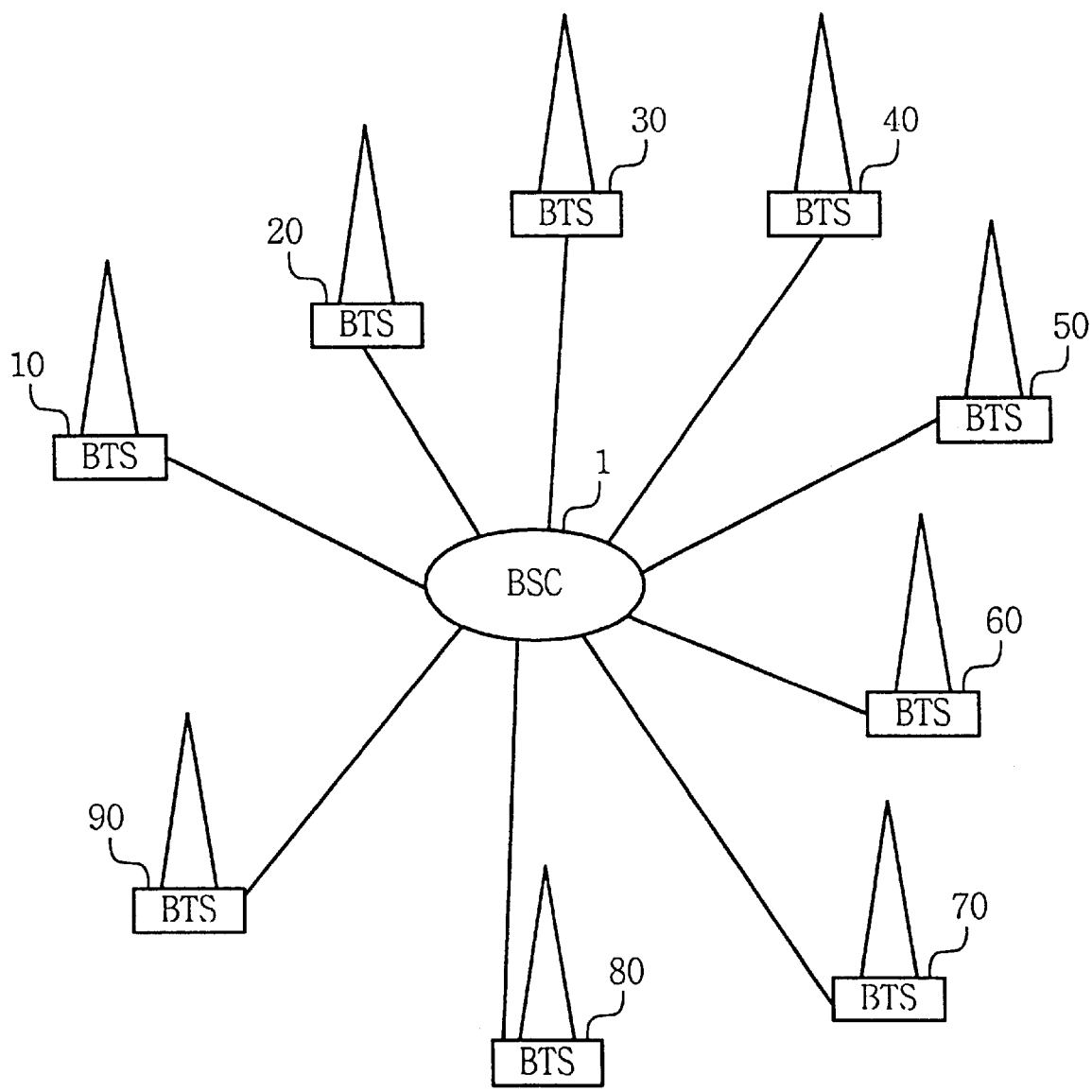
FIG. 1 illustrates a block diagram of conventional radiation type BTSs according to the prior art.
Figure 2:
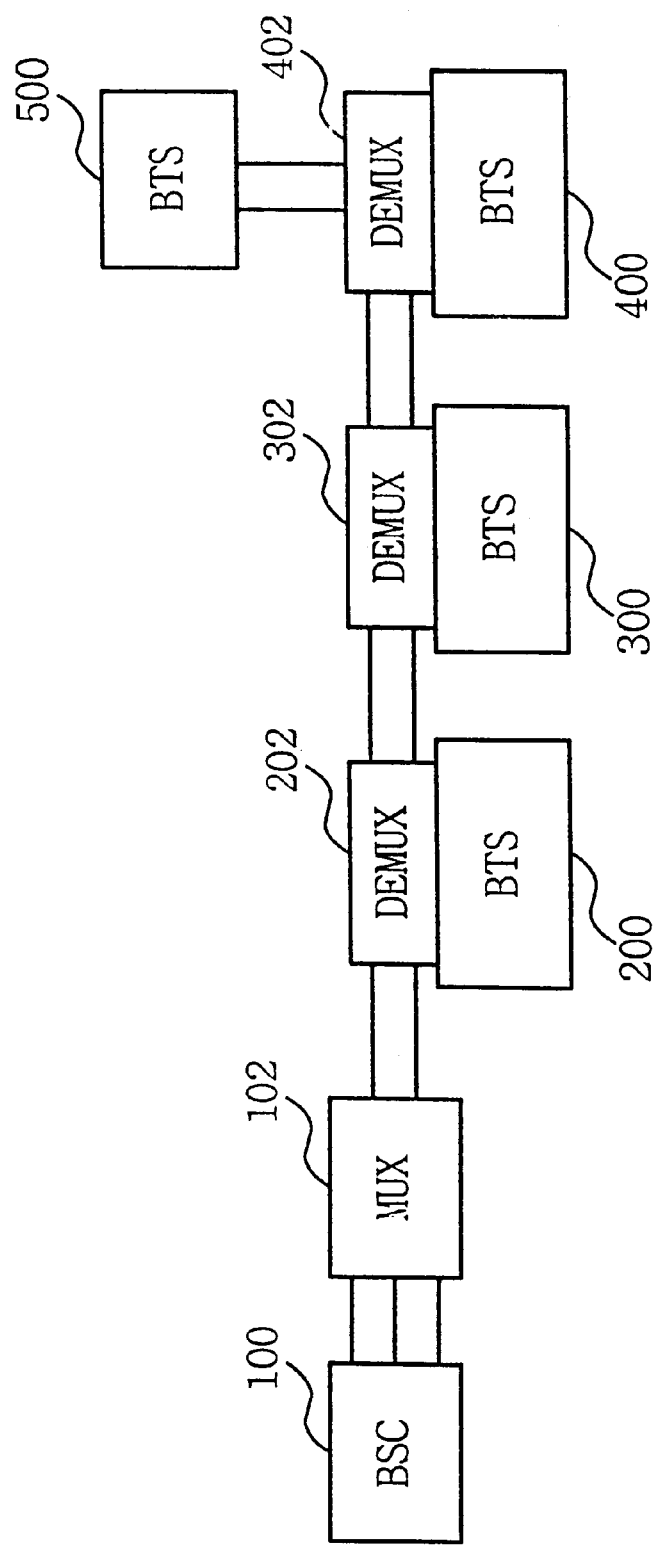
FIG. 2 illustrates a block diagram of daisy chained BTSs in accordance with the present invention.

FIG. 2 shows daisy chained BTSs in accordance with the present invention. As shown, the present invention is comprised of: a multiplexer 102 connected to the BSC 100, a demultiplexer 202 connecting the multiplexer 102 to the BTS 200, a demultiplexer 302 connecting the demultiplexer 202 to the BTS 300, a demultiplexer 402 connecting the demultiplexer 302 to the BTS 400, and the BTS 500 connected with the demultiplexer 402.

That is, the multiplexer 102 multiplexes the E1 or T1 lines which are connected from the BSC 100 to the BTSs, and transmits the traffic packet, control packet, alarm packet, and maintenance packet, etc., to the daisy chained BTSs 200, 300, 400, 500.

The demultiplexers 202, 302, 402 select the packet of the corresponding demultiplexer among the packets transmitted from the multiplexer 102 of the BSC or from the previous demultiplexers and forward the remaining packets to the other demultiplexers.

Figure 3:
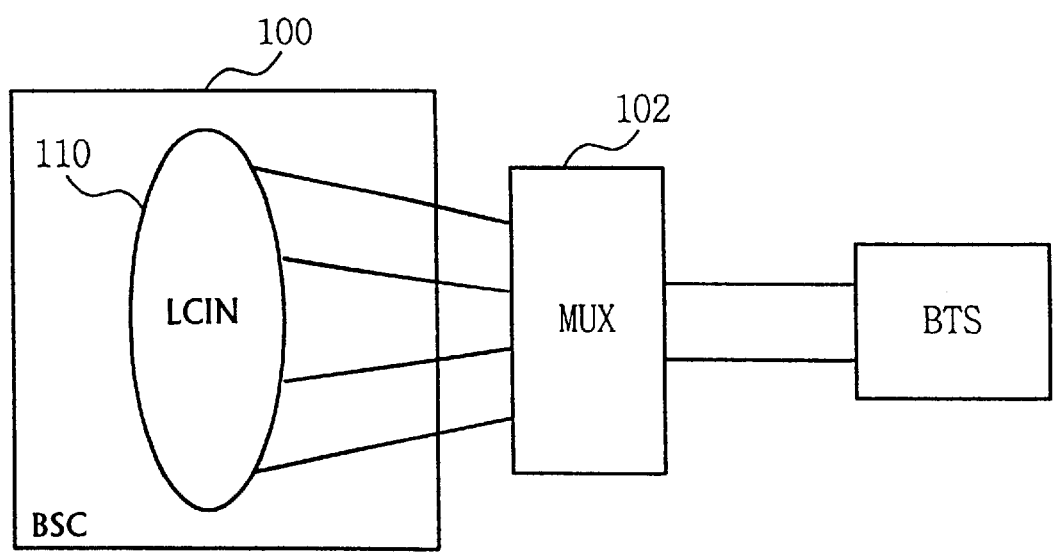
FIG. 3 illustrates a block diagram of a BSC and a multiplexer in accordance with the present invention.

FIG. 3 shows the configuration of the BSC and the multiplexer in accordance with the present invention. As shown, the multiplexer 102 is connected to the LCIN 110 of the BSC 100. The LCIN 110 adds a header to the packet and transmits the packet with the header to the multiplexer. The multiplexer 102 multiplexes the packets transmitted from the LCIN 110, and transmits the multiplexed packets to the daisy chained BTSs.

Figure 4:
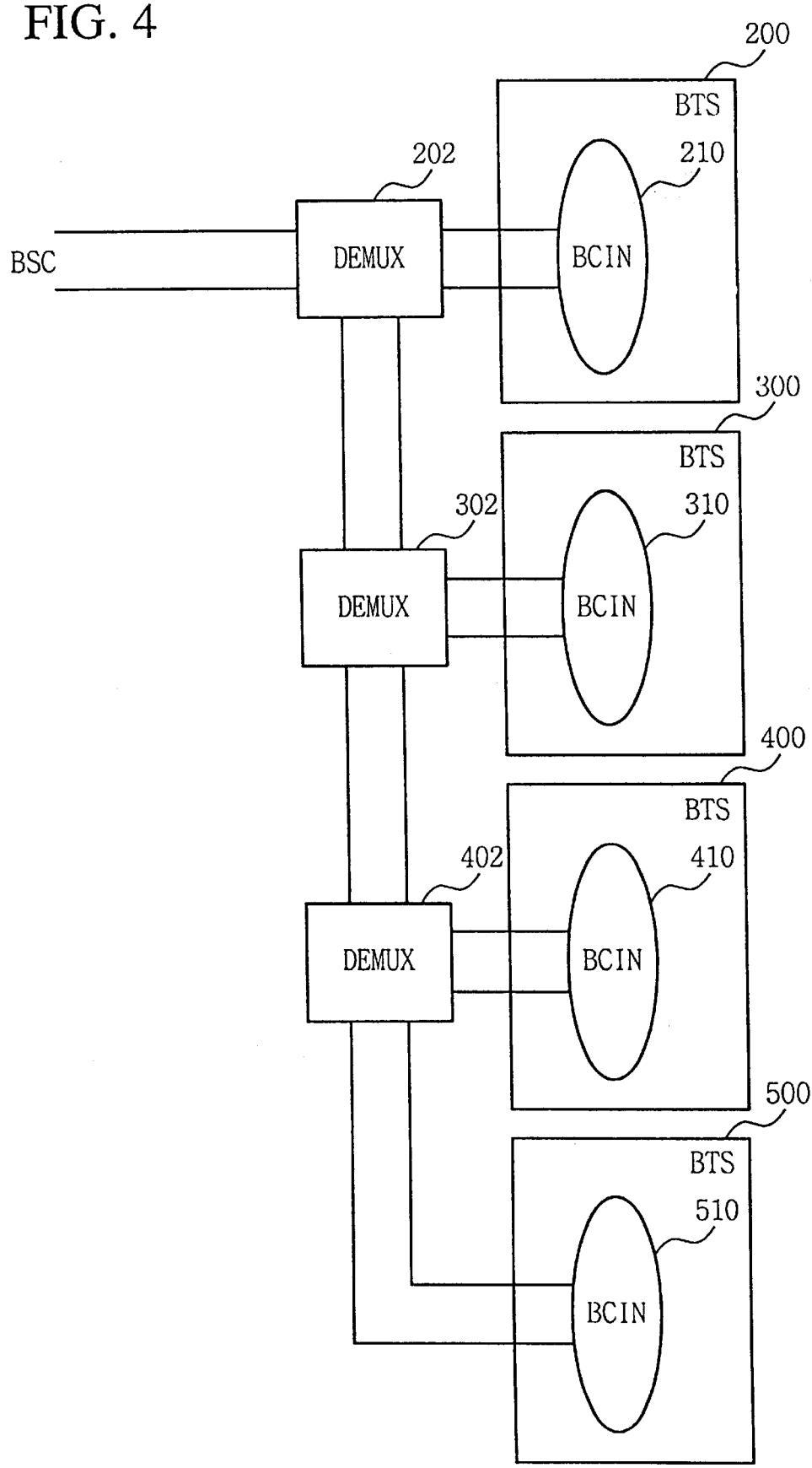
FIG. 4 illustrates a block diagram of demultiplexers and corresponding BTSs in accordance with the present invention.

FIG. 4 shows a configuration of the demultiplexers and the BTSs in accordance with the present invention. As shown, the demultiplexers 202, 302, 402 are connected to the BCIN 210, 310, 410, 510 of the daisy chained BTSs 200, 300, 400, 500. The demultiplexers check the addresses of the packets transmitted from the multiplexer of the BSC or the demultiplexer of the previous BTS, and transmit the packet having the address of the corresponding demultiplexer to the BCIN of the BTS, and pass the remaining packets to the next BTS.

As explained above, the daisy chained BTSs can be connected without modifying the configuration of the existing BSC and the BTSs, by respectively connecting the multiplexers and the demultiplexers to the LCIN of the BSC and the BCIN of the BTS.

In accordance with the present invention, packets are transferred from BSC to BTS as follows: the BSC outputs the packets directed to the daisy chained BTS through a multiplexer; the demultiplexer of the BTS receives these packets, and decodes the addresses of the received packets; and if the packet corresponds to the demultiplexer, the demultiplexer transmits the packet to the corresponding BTS, and passes the remaining packets to the next BTS.

In accordance with the present invention, packets are transferred from the BTS to the BSC or from the BTS to other daisy chained BTS as follows: when the packets generated in the BTS are transmitted to the demultiplexer, the demultiplexer stores the packets in a buffer, and decodes the destination address; after decoding, if the packet is directed to the corresponding BTS, the packet is transmitted to the corresponding BTS, and the remaining packets are transmitted to the BSC.

Figure 5:
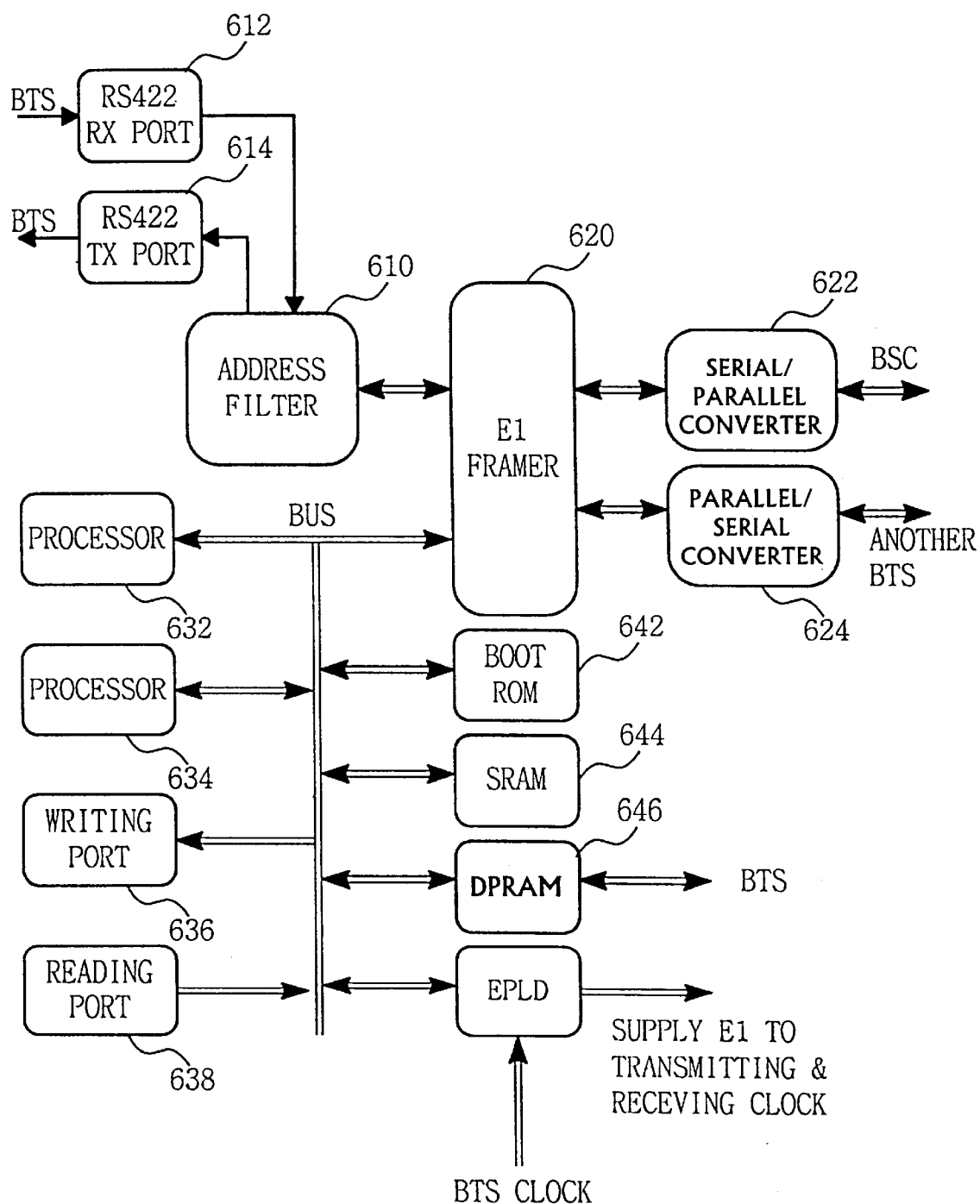
FIG. 5 illustrates a block diagram of a demultiplexer for a corresponding BTS in accordance with the present invention.

FIG. 5 shows a configuration of the demultiplexer of the BTS in accordance with the present invention. As shown, the demultiplexer comprises: an E1 or T1 framer 620 which is connected with the BSC through the serial to parallel converter 622, and is connected to other BTSs through the parallel to serial converter 624; and an address filter 610 which is connected with the E1 or T1 framer 620, and is connected to the BCIN of the corresponding BTS through the RS422 receiving port 612 and transmitting port 614. In order to control the operation of the E1 or T1 framer 620, processors 632, 634, read/write ports 636, 638, boot ROM (Read Only Memory) 642, SRAM (Static Random Access Memory) 644, DPRAM (Dual Port RAM) 646 connected with the BCIN of the corresponding BTS, and the EPLD (Electrical Programmable Logic Device) 648 receiving the clock of the BTS and generating the E1 or T1 transmit/receive clock are connected.

The packets transmitted from the BSC 100 are transmitted to the E1 or T1 framer 620 through the serial to parallel converter 622. The E1 or T1 framer 620 decodes the packets, and when the packet corresponds to the framer, transmits the packet to the corresponding BTS through the DPRAM 646, or else, transmits the packets to other BTSs through the parallel to serial converter 624.

The packets generated in the corresponding BTS are transmitted to the address filter 610 through the RS422 receiving port 612. When the address filter decodes the destination address of the packets, if the decoded destination address is directed to the corresponding BTS, then the address filter transmits the packet to the corresponding BTS again through the RS422 transmitting port 614, or else, transmits the packet to the BSC through the E1 or T1 framer 620.

In the present invention, a plurality of daisy chained BTSs can be connected to the BSC. It is possible to implement the daisy chained BTSs by dividing each of the plurality of BTSs using a multiplexer and demultiplexer, without changing the existing configuration of the BTSs and the BSC.

That is, the present invention makes it possible to multiplex packet addresses to a BTS and to separate the packets according to the corresponding BTS from packets to other BTSs by connecting the demultiplexer to the conventional BTS.

While the present invention has been described in detail with reference to the specific embodiment, it is a mere exemplary application. Thus, it is to be clearly understood that many variations can be made by anyone skilled in the art within the scope of the present invention.

What is claimed is:

1. A method for connecting daisy chained BTSs (Base Transceiver Stations) by utilizing a multiplexer and a demultiplexer, comprising the steps of:

generating packets which are to be transmitted by a BSC (Base Station Controller) to a plurality of daisy chained BTSs;

multiplexing said packets and transmitting said multiplexed packets to a first BTS of the plurality of daisy chained BTSs;

receiving said multiplexed packets at a first demultiplexer, and demultiplexing said multiplexed packets;

transmitting the demultiplexed packets to a first BTS if the demultiplexed packets are packets to be transmitted to said first BTS; and passing the demultiplexed packets to a next BTS if the demultiplexed packets are not packets to be transmitted to said first BTS.

2. The method as set forth in claim 1, wherein addresses of the BTSs to receive said packets are added to said packets in said step of multiplexing said packets.

3. The method as set forth in claim 2, wherein the method further comprises a step of decoding the address of the received packets a nd selecting only the packets having the address of a BTS connected to the first BTS and passing the selected packets to said first BTS.

4. A method for connecting daisy chained BTSs (Base Transceiver Stations) by utilizing a multiplexer and a demultiplexer, comprising the steps of:

generating packets to transmit to a selected BTS of a plurality of daisy chained BTSs;

decoding said generated packets using the demultiplexer;

if the decoded packets are packets to be transmitted to said selected BTS, transmitting said packets to said BTS; and if the decoded packets are not packets to be transmitted to said selected BTS, transmitting said generated packets to the BSC, through said plurality of daisy chained BTSs.

5. The method as set forth in claim 4, wherein said decoding step further comprises the steps of:

storing the packets in a buffer; and reading a destination address of the stored packets.

6. An apparatus for connecting daisy chained BTSs (Base Transceiver Stations) by utilizing a multiplexer and a demultiplexer, comprising:

a plurality of daisy chained BTSs;

a BSC (Base Station Controller) for generating packets to transmit to said plurality of daisy chained BTSs;

a multiplexer for multiplexing the generated packets; and a plurality of demultiplexers for receiving the multiplexed packets at a BTS and demultiplexing the multiplexed packets, transmitting the demultiplexed packets to a first BTS if the demultiplexed packets are packets to be transmitted to said first BTS, and transmitting the demultiplexed packets to a next BTS if the demultiplexed packets are not packets to be transmitted to said first BTS.

7. An apparatus as set forth in claim 6, wherein said multiplexer is connected to said BSC through a LCIN (Local Communication Interface Node assembly), and said each demultiplexer is connected to said respective BTS through a BCIN (BTS Communication Interconnect Network) within said respective BTS.

8. An apparatus as set forth in claim 7, wherein each demultiplexer comprises:

a serial-to-parallel converter;

a parallel-to-serial converter;

an E1/T1 framer being connected to the BSC through said serial-to-parallel converter and being connected to other BTSs through said parallel-to-serial converter;

an RS422 transmit/receive port;

an address filter being connected to said E1/T1 framer and being connected to the BCIN (BTS Communication Interconnect Network) in said respective BTS through said RS422 transmit/receive port;

a processor controlling the operation of said E1/T1 framer;

a write/read port;

a memory; and a programmable logic device generating an E1/T1.

9. An apparatus as set forth in claim 8, wherein said memory comprises:

a boot ROM (Read Only Memory);

a SRAM (Static Random Access Memory); and a DPRAM (Dual Port Random Access Memory).

10. An apparatus for connecting a plurality of daisy chained BTSs (Base Transceiver Stations) by utilizing a multiplexer, comprising:

a plurality of BTSs connected to a common BSC (Base Station Controller) and other BTSs, said BSC generating packets to transmit to a BTS;

a plurality of demultiplexers for receiving multiplexed packets and demultiplexing the multiplexed packets, transmitting the demultiplexed packets to a first BTS if the demultiplexed packets are packets to be transmitted to said first BTS, and transmitting the demultiplexed packets to a next BTS if the demultiplexed packets are not packets to be transmitted to said first BTS.

11. An apparatus as set forth in claim 10, wherein said each demultiplexer decodes packets by filtering addresses of the generated packets.

* * * * *